United States Patent
Kogler et al.

(10) Patent No.: US 11,319,433 B2
(45) Date of Patent: May 3, 2022

(54) LIGHT SCATTERING POLYMERIC COMPOSITION WITH IMPROVED SCATTERING EFFICIENCY AND IMPROVED MECHANICAL PROPERTIES

(71) Applicants: Röhm GmbH, Darmstadt (DE); Roehm America LLC, Parsippany, NJ (US)

(72) Inventors: René Kogler, Pfofeld (DE); Michael Pasierb, Berwick, ME (US); Christopher Spain, Wethersfield, CT (US); Ursula Golchert, Dieburg (DE); Ralf Richter, Hanau (DE); Ernst Becker, Bensheim (DE); Stefan Nau, Buettelborn (DE)

(73) Assignees: Röhm GmbH, Darmstadt (DE); Roehm America LLC, Parsippany, NJ (US)

( * ) Notice: Subject to any disclaimer, the term of this patent is extended or adjusted under 35 U.S.C. 154(b) by 74 days.

(21) Appl. No.: 15/733,465

(22) PCT Filed: Jan. 31, 2019

(86) PCT No.: PCT/EP2019/052325
§ 371 (c)(1),
(2) Date: Aug. 3, 2020

(87) PCT Pub. No.: WO2019/149799
PCT Pub. Date: Aug. 8, 2019

(65) Prior Publication Data
US 2021/0102058 A1   Apr. 8, 2021

Related U.S. Application Data

(60) Provisional application No. 62/626,618, filed on Feb. 5, 2018.

(30) Foreign Application Priority Data

Mar. 1, 2018 (EP) .................................. 18159341

(51) Int. Cl.
C08L 33/12   (2006.01)

(52) U.S. Cl.
CPC ........... *C08L 33/12* (2013.01); *C08L 2205/18* (2013.01)

(58) Field of Classification Search
CPC ........... C08L 33/00; C08L 83/04; C08L 33/12
See application file for complete search history.

(56) References Cited

U.S. PATENT DOCUMENTS

| | | |
|---|---|---|
| 5,237,004 A | 8/1993 | Chen et al. |
| 5,307,205 A | 4/1994 | Ludwig, Jr. et al. |
| 5,346,954 A | 9/1994 | Wu et al. |
| 6,803,416 B2 | 10/2004 | Schultes et al. |
| 7,371,795 B2 | 5/2008 | Wicker et al. |
| 8,609,011 B2 | 12/2013 | Hoess et al. |
| 2002/0123565 A1 | 9/2002 | Schultes et al. |
| 2006/0175735 A1 | 8/2006 | Hoess et al. |
| 2006/0240200 A1 | 10/2006 | Parusel et al. |
| 2007/0055017 A1 | 3/2007 | Schultes et al. |
| 2007/0060681 A1* | 3/2007 | Rudiger .................. B32B 27/36  524/155 |
| 2007/0112135 A1 | 5/2007 | Wicker et al. |
| 2008/0112055 A1* | 5/2008 | Aro ...................... G02B 5/0226  359/599 |
| 2008/0161446 A1 | 7/2008 | Siol |
| 2010/0272960 A1 | 10/2010 | Schultes et al. |
| 2011/0230610 A1 | 9/2011 | Schultes et al. |

FOREIGN PATENT DOCUMENTS

| | | |
|---|---|---|
| EP | 634445 A1 * | 1/1985 |
| EP | 1 022 115 | 7/2000 |
| JP | H04-134440 | 5/1992 |
| JP | 2012214669 A * | 11/2012 |
| WO | 2016/137919 | 9/2016 |
| WO | 2018/019965 | 2/2018 |
| WO | 2018/158145 | 9/2018 |

OTHER PUBLICATIONS

Scientific Polymer Website of Refractive Index of Polymers (Year: 2021).*
International Search Report dated May 10, 2019 in PCT/EP2019/052325.
Written Opinion dated May 10, 2019 in PCT/EP2019/052325.
International Preliminary Report on Patentability dated Oct. 1, 2019 in PCT/EP2019/052325.
U.S. Appl. No. 10/575,929, filed Apr. 14, 2006, 2007/0055017, Schultes et al.
U.S. Appl. No. 13/115,446, filed May 25, 2011, 2011/0230610, Schultes et al.

* cited by examiner

*Primary Examiner* — Mark S Kaucher
(74) *Attorney, Agent, or Firm* — Grüneberg and Myers PLLC

(57) ABSTRACT

Light scattering polymeric compositions have improved scattering efficiency and improved mechanical properties. The compositions include a polymeric matrix material and at least two different kinds of scattering particles uniformly dispersed therein.

20 Claims, No Drawings

LIGHT SCATTERING POLYMERIC COMPOSITION WITH IMPROVED SCATTERING EFFICIENCY AND IMPROVED MECHANICAL PROPERTIES

CROSS-REFERENCE TO RELATED APPLICATIONS

This application is a National Stage entry under § 371 of International Application No. PCT/EP2019/052325, filed on Jan. 31, 2019, which claims the benefit of U.S. Provisional Application No. 62/626,618, filed on Feb. 5, 2018 and European Application No. 18159341.9, filed on Mar. 1, 2018. The content of each of the above applications is hereby incorporated by reference in its entirety.

FIELD OF THE INVENTION

The present invention relates to light scattering polymeric compositions with improved scattering efficiency and improved mechanical properties. The compositions comprise a polymeric matrix material and at least two different kinds of scattering particles which are dispersed therein.

A further aspect of the present invention relates to light-scattering mouldings which are obtainable by thermoplastic moulding of the polymeric compositions of the invention.

Finally, a further aspect of the present invention relates to a method of manufacturing light-scattering mouldings using the polymeric composition of the present invention.

PRIOR ART

Light diffusing elements are widely used in applications such as protective covers for light fittings, screens for projection televisions, surface-emitting apparatuses and the like. In recent years, the light diffusing elements also have been used for enhancing the display quality of liquid crystal display devices and for improving their viewing angle characteristics.

Typically, light diffusing elements comprise a transparent matrix material and scattering particles which are uniformly dispersed therein. Materials typically used as scattering particles often include traditional inorganic opacifiers, e.g. $BaSO_4$ or $TiO_2$. Unfortunately, these materials have a low luminous efficiency, since they tend to backscatter a significant amount of the incoming light.

In the recent decades use of so-called scattering beads became common for scattering applications. The scattering beads are typically crosslinked polymeric materials whose refractive index differs from that of the matrix. The advantage of these scattering beads is a high level of forward scattering of the mouldings composition and therefore a high luminous efficiency. In order to characterise the extent of this preferred forward scattering in the light scattering polymeric composition the transmittance of the polymeric composition as well as the half-value angle on mouldings which include scattering beads are typically measured. A further important parameter characterising the scattering efficiency of a polymeric composition is the scattering impact which is defined as a product of the optical transmittance T ($D_{65}$) and the half-value angle β.

Typically, scattering effect of scattering beads becomes greater with the decreasing size of the scattering beads. For this reason, the amount of scattering beads in a scattering polymeric composition can normally be reduced by using smaller scattering beads. This reduction in the amount of scattering beads saves costs and conserves resources. However, use of small scattering beads markedly increases the perceived yellowness of the polymeric composition, in particular, if the scattering beads having an average particle diameter less than 1.0 μm are used.

On the other hand, scattering beads having an average particle diameter above 20 μm need to be used in a relatively high amount in order to achieve a sufficient scattering efficiency. The presence of such high amounts of scattering beads, however, becomes sometimes disadvantageous for several reasons. Large amounts of "hard" scattering beads in a polymethyl methacrylate (PMMA) matrix are known to have a disadvantageous effect on the mechanical properties of the resulting composition, in particular on the impact resistance and the elasticity modulus. Additionally, thermoplastic processing of the resulting polymeric composition, in particular by injection moulding, becomes more difficult because the scattering particles significantly increase the melt viscosity of the entire material. This can lead to formation of various defects during use of the composition, in particular during manufacturing of complex mouldings by injection moulding.

Finally, it should be borne in mind that light scattering articles are often designed to have a textured surface which inter alia can lead to low-reflecting surfaces and additionally helps to increase the scattering efficiency of the scattering article.

The surface structure of such light scattering articles strongly depends on the method for their manufacturing. For instance, light scattering articles manufactured by means of extrusion may have a structured surface formed due to the presence of large scattering beads which are located in a close proximity to the surface of the article. In other words, the scattering beads can be protruding out of the surface of the article.

If the light scattering article is manufactured by means of injection moulding, formation of a structured surface becomes more difficult and may often require the presence of additional additives and/or structured tools.

It should further be borne in mind that light coverings are often exposed to outdoor conditions and therefore need to be sufficiently resistant against solar radiation and humidity. The presence of inorganic scattering particles such as titanium dioxide can often lead to degradation of the polymeric matrix material, because upon exposure to solar radiation the scattering particles may act as a photocatalyst thereby generating highly reactive radicals from atmospheric oxygen and humidity. Additionally, some materials of scattering beads have only a limited long-term stability against solar UV radiation and are therefore not suitable for use under outdoor conditions.

As a consequence, many light scattering materials become increasingly yellow under outdoor conditions which is highly disadvantageous from an aesthetical point of view. In order to mask this undesired yellowing, so-called blueing agents are often used as additives. However, blueing agents also absorb visible light and therefore reduce the light transmittance ($D_{65}$) of the material.

Patent application EP 1 022 115 A1 describes polymeric particles having a textured surface and frosted appearance. These articles comprise a polymeric matrix and substantially spherical highly cross-linked polymeric particles having a particle size between 10 to 110 μm. Said polymeric particles typically need to be used in quantities of up to 20 wt.-% in order to achieve a reasonable scattering effect. This is disadvantageous at least from the economic point of view.

WO 2016/137919 A1 describes light scattering coverings for use in LED lighting applications. These coverings comprise primary organic scattering particles dispersed in a transparent polymeric matrix. WO 2016/137919 A1 admits that use of primary organic scattering particles may not be sufficient to provide a desired scattering effect. In such situations, the application suggests an additional use of inorganic secondary scattering particles. Unfortunately, this approach leads to a decreased transmittance of the resulting scattering coverings because of backscattering caused by the inorganic secondary scattering particles. Furthermore, corresponding light scattering coverings are not suitable for a long-term outdoor use.

US 2006/240200 describes light scattering sheets for LCD applications as well as method for the production and use thereof. The light scattering sheets comprise:
at least one light-scattering polymethyl methacrylate layer which comprises a polymethyl methacrylate matrix; and also from 0.5 to 59.5% by weight, based on the weight of the light-scattering polymethyl methacrylate layer, of inorganic spherical scattering particles (A) whose median size is in the range from 0.1 to 40 µm, and whose refractive index differs from that of the polymethyl methacrylate matrix by a value in the range from 0.02 to 0.2, and
from 0.5 to 59.5% by weight, based on the weight of the light-scattering polymethyl methacrylate layer, of organic spherical particles (B) whose median size is in the range from 10 to 150 µm and whose refractive index differs from that of the polymethyl methacrylate matrix by a value in the range from 0 to 0.2. Again, use of inorganic scattering particles results in a decreased optical transmittance, which is disadvantageous.

WO 2018/158145 A1 teaches a (meth)acrylic polymeric composition comprising 0.05 wt.-% to 2 wt.-% polymeric silicone particles having a weight average particle diameter between 1 µm and 10 µm and 5 wt.-% to 20 wt.-% polymeric (meth)acrylic particles having a weight average particle diameter between 30 µm and 100 µm. Although these polymeric compositions have interesting optical properties, they are known to have only a moderate impact resistance.

OBJECT OF THE INVENTION

In light of the cited prior art, the technical problem addressed by the present invention was provision of a light scattering polymeric composition having a combination of the following technical features:
high light scattering effect in combination with a high transmittance;
low total content of scattering particles;
excellent mechanical properties, in particular high impact resistance (e.g. Charpy impact strength) and elasticity modulus;
low yellowness index; and
high weathering resistance
Further technical problems addressed by the present invention are provision of light scattering articles having the above features as well as provision of a method for manufacturing of such light scattering articles.

SUMMARY OF THE INVENTION

The present invention is based on a surprising finding that use of polybutylacrylate-based scattering particles having an average particle size $d_1$ of from 5.0 µm to 20.0 µm in combination with second scattering particles chemically different from the first scattering particles and having an average particle size $d_2$ of from 1.0 µm to 50.0 µm may, upon an appropriate adjustment of their refractive indexes, lead to strong synergistic effects. In particular, the scattering effect of a moulding composition comprising said combination of particles is significantly stronger than the scattering effects of moulding compositions comprising either of both sorts of particles. Furthermore, and even more importantly, the resulting moulding composition has an excellent optical transmittance which, in combination with a given scattering effect, is not achievable using only one sort of scattering particles.

The total amount of scattering particles in the polymeric composition of the present invention is significantly lower than in the polymeric compositions with a comparably low yellowness index (Y.I.), which comprises either sorts of particles. This is not only advantageous from economic point of view but also results in excellent mechanical properties, in particular high impact resistance (e.g. Charpy impact strength) and elasticity modulus of the resulting polymeric compositions.

Finally, the inventors found that the scattering polymeric compositions of the present invention have an excellent weathering resistance and can be advantageously employed in outdoor applications such as rearlights for vehicles, street lights etc.

The scattering polymeric composition of the present invention comprises:
from 90.0 wt.-% to 99.9 wt.-%, based on the weight of the polymeric composition, of a polymeric matrix material which is substantially transparent and has a refractive index $n_{Dm}$ of from 1.35 to 1.65;
from 0.05 wt.-% to 5.0 wt.-%, preferably from 0.5 wt.-% to 5.0 wt.-%, more preferably from 1.0 wt.-% to 4.0 wt.-%, based on the weight of the polymeric composition, of a plurality of first scattering particles being polybutylacrylate-based scattering particles which are uniformly dispersed in the polymeric matrix material, wherein the first scattering particles are substantially spherical crosslinked polymeric particles having an average particle size $d_1$ of from 5.0 µm to 20.0 µm and having a refractive index $n_{D1}$, wherein the refractive index $n_{D1}$ is lower than the refractive index $n_{Dm}$ and the absolute difference between the refractive index $n_{D1}$ and the refractive index $n_{Dm}$ is not lower than 0.04;
from 0.05 wt.-% to 5.0 wt.-%, based on the weight of the polymeric composition, of a plurality of second scattering particles chemically different from the first scattering particles which are uniformly dispersed in the polymeric matrix material, wherein the second scattering particles are substantially spherical crosslinked polymeric particles having an average particle size $d_2$ of from 1.0 µm to 50.0 µm and having a refractive index $n_{D2}$,
wherein the absolute difference between the refractive index $n_{D2}$ and the refractive index $n_{Dm}$ is from 0.005 to 0.1.

In its further aspect, the present invention relates to a light scattering article comprising the polymeric composition as specified above.

Finally, a further aspect of the present invention relates to a process for the manufacturing of a light scattering article from the polymeric composition, wherein the process comprises a process step selected from extrusion, injection moulding and cast moulding.

DETAILED DESCRIPTION OF THE PREFERRED EMBODIMENTS

Polymeric Matrix Material

In a particularly preferred embodiment of the present invention, the substantially transparent polymeric matrix material is not cross-linked and therefore has thermoplastic properties. In this embodiment, the polymeric composition of the present invention can be employed in extrusion and injection moulding. Hence, in this embodiment, the polymeric composition of the present invention is a moulding composition.

The term "substantially transparent" as used in the present application refers to a material having a transmittance ($D_{65}$) of at least 50%, preferably at least 60%, more preferably at least 70%, even more preferably at least 80% and particularly preferably at least 90%, determined on a sample with a thickness of 2.0 mm according to the standard ISO 13468-2 (2006).

The polymeric matrix material for use of the present invention is, in principle, not particularly limited as long as it has a refractive index $n_{Dm}$ ranging from 1.35 to 1.65. For example, the polymeric matrix material may be selected from polyalkyl(meth)acrylate, poly(meth)acrylmethylimide, polycarbonate, polystyrene, polyethylene terephthalate, polyethylene, polypropylene, a styrene-copolymer, a cycloolefin-polymer, a cycloolefin-copolymer or a mixture thereof. In particularly preferred embodiments, the polymeric matrix material is selected from polyalkyl(meth)acrylate, poly(meth)acrylalkylimide and co-polyalkyl(meth)acrylate comprising styrene and/or maleic anhydride as co-monomers as well as mixtures thereof.

The polyalkyl(meth)acrylate can be used alone or as a mixture of different polyalkyl (meth)acrylates. The polyalkyl(meth)acrylate can moreover also be a copolymer and comprise repeating units other than polyalkyl(meth)acrylate units. Examples thereof include units derived from styrene and/or an unsaturated acid anhydride e.g. maleic acid anhydride or unsaturated acids such as methacrylic acid.

The term "(meth)acrylate" as used herein refers not only to methacrylates, e.g. methyl methacrylate, ethyl methacrylate, etc. but also acrylates, e.g. methyl acrylate, ethyl acrylate, etc. and also to mixtures composed of these repeating units.

For the purposes of the present invention, particular preference is given to homo- and copolymers of C1-C18-alkyl (meth)acrylates, advantageously of C1-C10-alkyl (meth)acrylates, in particular of C1-C4-alkyl (meth)acrylate polymers. If appropriate, these can also comprise repeating units which differ therefrom.

The polymeric matrix material is advantageously selected from copolymers which contain from 80.0 wt.-% to 100.0 wt.-%, in particular from 90.0 wt.-% to 99.9 wt.-%, more preferably from 95.0 wt.-% to 99.8 wt.-% of C1-C10-alkyl methacrylates, based on the weight of the copolymer. Preferred C1-C10-alkyl methacrylates encompass methyl methacrylate, ethyl methacrylate, propyl methacrylate, isopropyl methacrylate, n-butyl methacrylate, isobutyl methacrylate, tert-butyl methacrylate, pentyl methacrylate, hexyl methacrylate, heptyl methacrylate, octyl methacrylate, isooctyl methacrylate, and ethylhexyl methacrylate, nonyl methacrylate, decyl methacrylate, and also cycloalkyl methacrylates, for example cyclohexyl methacrylate, isobornyl methacrylate or ethylcyclohexyl methacrylate. Use of methyl methacrylate as a major repeating unit is particularly preferred.

Preferred C1-C10-alkylacrylates encompass methyl acrylate, ethyl acrylate, propyl acrylate, isopropyl acrylate, n-butyl acrylate, isobutyl acrylate, tert-butyl acrylate, pentyl acrylate, hexyl acrylate, heptyl acrylate, octyl acrylate, isooctyl acrylate, nonyl acrylate, decyl acrylate, and ethylhexyl acrylate, and also cycloalkyl acrylates, for example cyclohexyl acrylate, isobornyl acrylate or ethylcyclohexyl acrylate.

Very particularly preferred copolymers encompass from 80.0 wt.-% to 100.0 wt.-%, preferably from 90.0 wt.-% to 99.9 wt.-%, more preferably from 95.0 wt.-% to 99.8 wt.-%, of methyl methacrylate units and from 0.0 wt.-% to 20.0 wt.-%, preferably from 0.1 wt.-% to 10.0 wt.-%, more preferably from 0.2 wt.-% to 5.0 wt.-% of C1-C10-alkyl acrylate units, based on the weight of the copolymer, methyl acrylate units, ethyl acrylate units and/or butyl acrylate units being particularly preferable. The corresponding copolymers are commercially available under the trademark PLEXIGLAS® from Evonik Performance Materials GmbH.

In yet a further particularly preferred embodiment, the copolymer has the following composition:
from 70.0 to 95.0 wt.-%, based on the weight of the copolymer, of methyl methacrylate;
from 0.5 to 15.0 wt.-%, based on the weight of the copolymer, of maleic anhydride; and
from 0.0 to 25.0 wt.-%, based on the weight of the copolymer, of vinyl-copolymerizable monomers having no functional groups other than the vinyl function, styrene being most preferred.

The polyalkyl(meth)acrylates are produced by free-radical polymerization processes, in particular bulk polymerization, solution polymerization, suspension polymerization and emulsion polymerization processes. Initiators particularly suitable for these purposes encompass in particular azo compounds, such as 2,2'-azobis(isobutyronitrile) or 2,2'-azobis(2,4-dimethylvaleronitrile), redox systems, e.g. the combination of tertiary amines with peroxides or sodium disulphite and persulphates of potassium, sodium or ammonium, or preferably peroxides (in which connection cf for example H. Rauch-Puntigam, Th. Völker, "*Acryl-and Methacrylverbindungen*" [Acrylic and methacrylic compounds], Springer, Heidelberg, 1967, or Kirk-Othmer, Encyclopedia of Chemical Technology, Vol. 1, pages 386 ff, J. Wiley, New York, 1978). Examples of particularly suitable peroxide polymerization initiators are dilauroyl peroxide, tert-butyl peroctoate, tert-butyl perisononanoate, dicyclohexyl peroxodicarbonate, dibenzoyl peroxide and 2,2-bis(tert-butylperoxy)butane. It is also possible and preferred to carry out the polymerization reaction using a mixture of various polymerization initiators of different half-lifetime, examples being dilauroyl peroxide and 2,2-bis(tert-butylperoxy)butane, in order to maintain a constant stream of free radicals during the course of the polymerization reaction, and also at various polymerization temperatures. The amounts used of polymerization initiator are generally from 0.01 wt.-% to 2.0 wt.-%, based on the monomer mixture. The polymerization reaction can be carried out continuously or batchwise.

The chain lengths of the polymers or copolymers can be adjusted by polymerizing the monomer or monomer mixture in the presence of molecular-weight regulators, a particular example being the mercaptans known for this purpose, e.g. n-butyl mercaptan, n-dodecyl mercaptan, 2-mercaptoethanol or 2-ethylhexyl thioglycolate, pentaerythritol tetrathioglycolate; the amounts used of the molecular-weight regulators generally being from 0.05 wt.-% to 5.0 wt.-%, preferably from 0.1 wt.-% to 2.0 wt.-% and particularly preferably from 0.2 wt.-% to 1.0 wt.-%, based on the monomer or monomer mixture (cf. H. Rauch-Puntigam, Th. Völker, "*Acryl-and Methacrylverbindungen*" [Acrylic and methacrylic compounds], Springer, Heidelberg, 1967; Houben-Weyl, Methoden der organischen Chemie [Methods of organic chemistry], Vol. XIV/1, page 66, Georg Thieme, Heidelberg, 1961, or Kirk-Othmer, Encyclopedia of Chemical Technology, Vol. 1, pages 296 ff, J. Wiley, New York, 1978). n-Dodecyl mercaptan is particularly preferably used as a molecular-weight regulator.

Preferably, the polyalkyl(meth)acrylate for use as a polymeric matrix material is not cross-linked.

The polymeric matrix material may moreover comprise other polymers in order to modify its properties. Among these are, inter alia, polyacrylonitriles, co-polyalkyl(meth) acrylates comprising styrene and/or maleic anhydride as co-monomers, polystyrenes, polyethers, polyesters, polycarbonates and polyvinyl chlorides. These polymers may be used individually or in the form of a mixture, and it is also possible to use copolymers which are derivable from the abovementioned polymers.

The weight-average molar mass Mw of the homo- and/or copolymers to be used as a polymeric matrix material may vary within a wide range, the molar mass usually being matched to the intended use and to the intended mode of processing of the polymeric composition. However, it is generally in the range from 20 000 to 1 000 000 g/mol, preferably from 50 000 to 500 000 g/mol and particularly preferably from 80 000 to 300 000 g/mol.

Scattering Particles

The first and the second scattering particles preferably have a uniform distribution within the polymeric matrix material of the polymeric composition, with no significant aggregation or agglomeration of the particles. Uniform distribution means that the concentrations of the first and the second scattering particles within the polymeric material matrix are substantially constant.

The mixing of the polymeric material matrix with the scattering particles to give the polymeric composition preferably takes place via mixing in the melt, by means of a single- or twin-screw extruder, with no intended resultant limitation.

The first scattering particles and the second scattering particles are substantially spherical. The term "substantially spherical" as used herein indicates that the aspect ratio i.e. the ratio of the largest dimension of the scattering particles to their smallest dimension is not more than 4, preferably not more than 2, each of these dimensions being measured through the centre of gravity of the particles. Preferably, at least 70% of the particles are substantially spherical, particularly preferably at least 90%, based on the number of the scattering particles.

The refractive indexes $n_{Dm}$, $n_{D1}$, and $n_{D2}$ are measured at the Na D-line at 589 nm at 23° C. as specified in the standard ISO 489 (1999). As will be readily appreciated by a skilled person, the refractive index of the polymeric matrix material $n_{Dm}$ is advantageously determined using the Procedure A of the standard ISO 489 (1999), whereas the refractive index of the first scattering particles $n_{D1}$ and of the second scattering particles $n_{D2}$ is advantageously measured using the Procedure B of the standard ISO 489 (1999).

Without wishing to be bound by theory, the inventors found that the synergistic effect arising from the presence of two different kinds of scattering particles is particularly strong when the absolute difference between the refractive index $n_{D1}$ and the refractive index $n_{Dm}$ is not lower 0.04, preferably from 0.05 to 0.16, preferably from 0.05 to 0.10. In particular, it appears, that the scattering impact of the scattering polymeric composition becomes lower if the absolute difference between the refractive index $n_{D1}$ and the refractive index $n_{Dm}$ is lower than 0.04 or higher than 0.16.

In one preferred embodiment, the refractive index of the second scattering particles $n_{D2}$ is higher than the refractive index of the polymeric matrix material $n_{Dm}$. For the sake of achieving a particularly strong scattering effect of the polymeric composition, the absolute difference between the refractive index of second scattering particles $n_{D2}$ and the refractive index of the polymeric matrix material $n_{Dm}$ should preferably be adjusted to be from 0.005 to 0.1, preferably from 0.01 to 0.09, more preferably from 0.02 to 0.06. In particular, if the absolute difference between the refractive index of the second scattering particles $n_{D2}$ and the refractive index of the polymeric matrix material $n_{Dm}$ were below 0.005, the contribution of the second scattering particles to the scattering behaviour of the polymeric composition would be rather low. This would require that the second scattering particles are present in the polymeric composition in a higher amount to ensure a sufficient scattering effect.

In a further preferred embodiment, the refractive index of the second scattering particles $n_{D2}$ is lower than the refractive index of the polymeric matrix material $n_{DM}$. For the sake of achieving a particularly strong scattering effect of the moulding composition, the absolute difference between the refractive index of second scattering particles $n_{D2}$ and the refractive index of the polymeric matrix material $n_{DM}$ should ideally be adjusted to be from 0.01 to 0.15, preferably from 0.01 to 0.09, more preferably from 0.02 to 0.09. In particular, if the absolute difference between the refractive index of second scattering particles $n_{D2}$ and the refractive index of the polymeric matrix material $n_{DM}$ were below 0.01, the contribution of the second scattering particles to the scattering behaviour of the moulding composition would be rather low. This would require that the second scattering particles are present in the moulding composition in a higher amount to ensure a sufficient scattering effect.

Furthermore, it showed to be advantageous to select the materials of the first scattering particles, the second scattering particles and the polymeric matrix material in such a way that the absolute difference between the refractive index $n_{D1}$ and the refractive index $n_{D2}$ is from 0.15 to 0.001, preferably from 0.15 to 0.007. This leads to particularly advantageous optical properties of the resulting scattering polymeric composition.

The average particle size of the first scattering particles (average diameter-weight average) is in the range from 5.0 to 20.0 μm, preferably in the range from 7.0 to 15.0 μm, and still more preferably in the range from 8.0 to 12.0 μm.

The first scattering particles as well as the second scattering particles advantageously have maximum narrowness of size distribution. A size of at least 5.0 μm is preferably possessed by at least 60% of the first scattering particles within the polymeric composition, and a size of more than 20.0 μm is preferably possessed by at most 30% of the first scattering particles.

The average particle size—indicated as so-called volume averaged $d_{50}$-value (that is 50 percent by volume of the particles have a particle size below the specified average particle size) of the first scattering particles and of the second scattering particles can be measured in accordance with the standard for laser diffraction measurements ISO 13320-1 (2009). Typically, the size of the scattering particles is determined in each case in dry powder form by laser light scattering (at room temperature, 23° C.) using Beckman Coulter LS 13 320 laser diffraction particle size analyser, tornado dry powder system. The measurement is carried out as described in the manual. For computer-aided analysis model Mie is used.

The first scattering particles are typically cross-linked polybutylacrylate-based scattering particles. Said particles comprise at least 70 wt.-%, preferably at least 80 wt.-% polybutylacrylate, based on the weight of said particles. Typically, said particles comprise at least 70 wt.-%, preferably at least 80 wt.-%, most preferred at least 85 wt.-%, polybutylacrylate, based on the weight of said particles. The corresponding scattering particles are known to a skilled person and are typically prepared by a suspension polymerisation process.

Crosslinking monomers suitable for use as in the spherical polymer particles (beads) are well known to those skilled in the art, and are generally monomers copolymerizable with monomers present, and having at least two or more unsaturated vinyl groups which have approximately equal or different reactivities, such as divinyl benzene, glycol di- and tri-methacrylate and acrylates, ethylene glycol dimethylacrylate, allyl methacrylates, diallyl maleate, allyl acryloxypropionates, butylene glycol diacrylates, etc. Preferred crosslinkers are ethylene glycol dimethacrylate, divinylbenzene, and allyl methacrylate. Most preferred is allyl methacrylate.

The production of crosslinked plastics particles is known to those skilled in the art. For example, the scattering particles may be produced by emulsion polymerization, for example as described in EP-A 342 283 or EP-A 269 324, and very particularly preferably via organic-phase polymerization, for example as described in the German Patent Application DE 43 27 464. The last-mentioned polymerization technique gives particularly narrow particle size distributions or, in other words, particularly small deviations of the particle diameters from the average particle diameter.

The term "crosslinked" as used herein means that the material of the scattering particles cannot be dissolved at all in a strong organic solvent, such as tetrahydrofuran or methylene chloride. The swell ratio measurement, which measures the particle size change in an organic solvent after a certain period of time, is normally a test method to determine the degree of crosslinking. A low swell ratio, no soluble fraction in a MDC/THF solvent, and the retention of particle integrity are the indications of a highly crosslinked acrylic polymer.

Examples of first scattering particles include but are not limited to matting and light diffusion agents such as Kane Ace™ MP90, Kane Ace™ MP91 etc. which are commercially available from Kaneka Belgium BV (Westerlo, Belgium).

In one embodiment, the second scattering particles may encompass a material selected from crosslinked polysiloxanes and/or crosslinked poly(meth)acrylates. Scattering agents composed of polysiloxanes and particularly preferably used in the present invention are commercially obtainable from Momentive Performance Materials (Leverkusen, Germany) under the tradenames TOSPEARL® 120 and TOSPEARL® 3120, TSR 9000. These particles are crosslinked polysiloxanes (polymethylsilsesquioxanes).

If the second scattering particles comprise crosslinked polysiloxanes, the polymeric composition typically comprises from 0.07 wt.-% to 3.0 wt.-%, preferably from 0.09 wt.-% to 1.5 wt.-%, more preferably from 0.1 wt.-% to 1.0 wt.-% of the second scattering particles, based on the weight of the polymeric composition.

In a further preferred embodiment the second scattering particles have the following composition:
from 60 wt.-% to 80 wt.-%, preferably from 65 wt.-% to 75 wt.-%, of alkyl (meth)acrylates from 39.9 wt.-% to 19.9 wt.-%, preferably from 34.5 wt.-% to 24.5 wt.-%, of styrene from 0.1 wt. % to 3.0 wt.-%, preferably from 0.5 wt.-% to 1.5 wt.-%, of a cross-linking monomer In this embodiment, the average particle size of the second scattering particles (average diameter-weight average) is in the range from 15.0 µm to 50.0 µm, preferably in the range from 45.0 µm to 30.0 µm, and still more preferably in the range from 45.0 µm to 35.0 µm.

If the second scattering particles comprise crosslinked polyalkyl(meth)acrylates such as crosslinked polyalkylacrylates, the polymeric composition typically comprises from 0.5 wt.-% to 5.0 wt.-%, preferably from 1.0 wt.-% to 5.0 wt.-%, more preferably from 2.0 wt.-% to 5.0 wt.-% of the first scattering particles, based on the weight of the polymeric composition.

The second scattering particles preferably comprise:
a2) from 25 to 99.9 parts by weight of monomers which have aromatic groups as substituents, for example styrene, α-methylstyrene, ring-substituted styrenes, phenyl(meth) acrylate, benzyl(meth)acrylate, 2-phenylethyl(meth)acrylate, 3-phenylpropyl(meth)acrylate or vinyl benzoate;

b2) from 0 to 74.9 parts by weight of an acrylic and/or methacrylic ester having 1 to 12 carbon atoms in the aliphatic ester radical, these being copolymerizable with the monomers a2), and mention may be made here of the following by way of example: methyl(meth)acrylate, ethyl(meth)acrylate, n-propyl(meth)acrylate, isopropyl (meth)acrylate, n-butyl(meth)acrylate, isobutyl(meth) acrylate, tert-butyl(meth)acrylate, cyclo-hexyl(meth) acrylate, 3,3,5-trimethylcyclohexyl(meth)acrylate, 2-ethylhexyl(meth)acrylate, norbornyl(meth)acrylate or isobornyl(meth)acrylate; and c2) from 0.1 to 15 parts by weight of crosslinking comonomers which have at least two unsaturated groups copolymerizable by a free-radical route with a2) and, where appropriate, with b2), examples being divinylbenzene, glycol di(meth)acrylate, 1,4-butanediol di(meth)acrylate, allyl(meth)acrylate, triallyl cyanurate, diallyl phthalate, diallyl succinate, pentaerythritol tetra(meth)acrylate or trimethylolpropane tri-(meth)acrylate, where the amounts of the comonomers a2), b2) and c2) give a total of 100 parts by weight.

The polymeric compositions of the present invention may further include conventional additives of any type. These include antistatic agents, antioxidants, mould-release agents, flame retardants, lubricants, dyes, flow improvers, fillers, light stabilizers and organic phosphorus compounds, such as phosphites or phosphonates, pigments, weathering stabilizers and plasticizers or mixtures thereof.

Properties of the Polymeric Composition

The polymeric compositions described above can be advantageously employed for the manufacturing of light scattering articles such as protective light fittings etc. using known moulding processes, such as injection moulding or extrusion.

Since the polymeric compositions of the present invention comprise a relatively low total amount of scattering particles, the mechanical properties, in particular impact resistance and modulus of elasticity of the polymeric compositions substantially correspond to properties of unmodified (i.e. neat) polymeric matrix material.

Typically, the Charpy impact strength of the scattering polymeric composition of the present invention is at least 20 kJ/m$^2$, more preferably at least 25 kJ/m$^2$. The Charpy impact strength is advantageously determined according to the test standard: ISO 179-1 (2010), edgewise (Charpy impact strength: ISO 179-1/1eU (2010), Charpy impact strength notched: ISO 179-1/1eA (2010)).

The polymeric composition of the present invention typically has the modulus of elasticity of at least 2000 MPa, more preferably at least 2500 MPa, even more preferably at least 3000 MPa. As will be readily appreciated by a skilled person, determination of the modulus of elasticity, should be performed according to the test standard ISO 527-2 (2012).

The scattering polymeric composition of the present invention has a surprisingly low yellowness index Y.I. of not more than 5.0, preferably not more than 4.0, more preferably not more than 3.5 measured with a specimen having a thickness of 2.0 mm. The yellowness index can be determined according to the standard ISO 17223 (2014 (E)) (transmission, optical geometry 0:di, CIE standard illuminant D$_{65}$, colour system X$_{10}$Y$_{10}$Z$_{10}$) by using an instrument such as Agilent Cary 5000 spectrophotometer.

Particularly preferred embodiments of the light-scattering moulding exhibit transmittance T, measured with a specimen having a thickness of 2.0 mm according to ISO 13468-2 (2006) of ≥72%, preferably ≥76%, yellowness index (Y.I.) to ISO 17223 (2014 (E)) of ≥5.0, preferably ≥4.0, and a half-value angle β of ≥5.0°, preferably ≥8.0° but no limitation is implied here. The entire contents of each of the above-identified standards are hereby incorporated by reference.

In order to determine transmittance T to ISO 13468-2, yellowness index (Y.I.) to ISO 17223 (2014 (E)) and the half-value angle β the polymeric composition is typically injection moulded to give a test specimen of dimension 60×45×2.0 mm³.

Due to synergistic effects of the first scattering particles and the second scattering particles, the half-value angle β of the polymeric composition, measured with a specimen having a thickness of 2.0 mm, is as high as at least 5.0°, preferably at least 8.0°, more preferably at least 10.0°. Half-value angle can be determined according to the standard DIN 5036 (1978) using a GO-T-1500 LMT goniometer test unit.

As will be readily appreciated by a skilled person, the product of the transmittance T ($D_{65}$) and the half-value angle β is a particularly important parameter for characterising light-scattering polymeric compositions. This parameter is known as "scattering impact" q. A high scattering impact $\eta = T*\beta$ indicates that the polymeric composition has a combination of an excellent transmittance of visible light and a high half-value angle β. It is preferred that the scattering impact of the polymeric composition, measured with a specimen having a thickness of 2.0 mm, is at least 5.0°, more preferably at least 10.0°. Remarkably, the polymeric composition of the present invention complies with these requirements.

Finally, the polymeric composition of the present invention is characterized by a high weathering resistance and stability of the optical quality under the effect of moisture. Weathering resistance tests can be performed in line with the standard ISO 4892-2 (2013(E)), Table 3, Method A, Cycle 1, relative humidity 65%.

An accelerated laboratory weathering test following the standard ISO 4892-2 (2013(E), method A, cycle 1, footnote c) can be carried out under the following conditions:
total exposure time: 2 500 h
radiant exposure after 2500 h: 0.54 GJ/m²
irradiance: 60±2 W/m² (broadband 300 nm to 400 nm)
temperatures: chamber 38±3° C., black standard 65±3° C.
humidity: 65±10% RH
102 min dry, 18 min water spray After a test under these conditions, the yellowness index Y.I. as defined in the standard ISO 17223 (2014) (transmission, optical geometry 0:di, CIE standard illuminant D65, colour system $X_{10}Y_{10}Z_{10}$) is not higher than 5.0, preferably not higher than 3.5, wherein the thickness of the specimen is 2.0 mm.

Notwithstanding the above, the present application further discloses the following embodiments {1} to {15}:
{1} A polymeric composition, comprising:
  from 90.0 wt.-% to 99.45 wt.-%, based on the weight of the polymeric composition, of a polymeric matrix material which is substantially transparent and has a refractive index $n_{Dm}$ of from 1.35 to 1.65;
  from 0.05 wt.-% to 5.0 wt.-%, based on the weight of the polymeric composition, of a plurality of first scattering particles which are uniformly dispersed in the polymeric matrix material, wherein the first scattering particles are substantially spherical crosslinked polymeric particles having an average particle size $d_1$ of from 1.0 µm to 10.0 µm and having a refractive index $n_{D1}$,
  wherein the refractive index $n_{D1}$ is lower than the refractive index $n_{Dm}$ and the absolute difference between the refractive index $n_{D1}$ and the refractive index $n_{Dm}$ is not lower than 0.04;
  from 0.5 wt.-% to 5.0 wt.-%, based on the weight of the polymeric composition, of a plurality of second scattering particles which are uniformly dispersed in the polymeric matrix material, wherein the second scattering particles are substantially spherical crosslinked polymeric particles having an average particle size $d_2$ of from 15.0 µm to 50.0 µm and having a refractive index $n_{D2}$,
  wherein the absolute difference between the refractive index $n_{D2}$ and the refractive index $n_{Dm}$ is from 0.005 to 0.1,
  wherein the refractive indexes $n_{Dm}$, $n_{D1}$, and $n_{D2}$ are measured at the Na D-line at 589 nm at 20° C.
{2} The polymeric composition according to {1}, wherein the absolute difference between the refractive index $n_{D1}$ and the refractive index $n_{Dm}$ is from 0.05 to 0.16, preferably from 0.05 to 0.10.
{3} The polymeric composition according to {1} or {2}, wherein
  the refractive index $n_{D2}$ is higher than the refractive index $n_{Dm}$, wherein the absolute difference between the refractive index $n_{D2}$ and the refractive index $n_{Dm}$ is from 0.01 to 0.08, preferably from 0.01 to 0.07, more preferably from 0.01 to 0.06.
{4} The polymeric composition according to any of {1} to {3}, wherein the absolute difference between the refractive index $n_{D1}$ and the refractive index $n_{D2}$ is from 0.3 to 0.05, preferably from 0.2 to 0.07.
{5} The polymeric composition according to any of {1} to {4}, wherein the polymeric matrix material is selected from polyalkyl(meth)acrylates, polycarbonates, polystyrenes, poly(meth)acrylalkylimides, polyacrylonitriles, polyamides, polyester, polyolefines as well as copolymers and/or mixtures thereof.
{6} The polymeric composition according to any of {1} to {4}, wherein the polymeric matrix material is polyalkyl (meth)acrylate being a copolymer comprising from 80.0 wt.-% to 100.0 wt.-%, preferably from 90.0 wt.-% to 99.9 wt.-%, more preferably from 95.0 wt.-% to 99.8 wt.-%, of methyl methacrylate units and from 0.0 wt.-% to 20.0 wt.-%, preferably from 0.1 wt.-% to 10.0 wt.-%, more preferably from 0.2 wt.-% to 5.0 wt.-% of C1-C10-alkyl acrylate units, based on the weight of the copolymer.
{7} The polymeric composition according to any of {1} to {6}, wherein the first scattering particles comprise a crosslinked polysiloxane and the polymeric composition comprises from 0.07 wt.-% to 3.0 wt.-%, preferably from 0.09 wt.-% to 1.5 wt.-%, more preferably from 0.1 wt.-% to 1.0 wt.-% of the first scattering particles, based on the weight of the polymeric composition.
{8} The polymeric composition according to any of {1} to {6}, wherein the first scattering particles comprise crosslinked polyalkyl(meth)acrylate, preferably crosslinked polyalkylacrylate, and the polymeric composition comprises from 0.5 wt.-% to 5.0 wt.-%, preferably from 1.0 wt.-% to 5.0 wt.-%, more preferably from 2.0 wt.-% to 5.0 wt.-% of the first scattering particles, based on the weight of the polymeric composition.
{9} The polymeric composition according to any of {1} to {8}, wherein the second scattering particles comprise at least one of crosslinked polyalkyl(meth)acrylate and polystyrene and the polymeric composition comprises from 0.5 wt.-% to 5.0 wt.-%, preferably from 1.0 wt.-% to 5.0 wt.-%, more preferably from 2.0 wt.-% to 5.0 wt.-% of the second scattering particles, based on the weight of the polymeric composition.
{10} The polymeric composition according to any of {1} to {9}, wherein the half-value angle of the polymeric composition, measured with a specimen having a thickness of 2.0 mm, is at least 5°, preferably at least 8°, more preferably at least 10°.
{12} The polymeric composition according to any of {1} to {11}, wherein the transmittance ($D_{65}$) of the polymeric composition is at least 50%, preferably at least 55%, more preferably at least 60%, determined on a specimen with a thickness of 2.0 mm according to the norm ISO 13468-2.

{13} The polymeric composition according to any of {1} to {12}, wherein the scattering impact of the polymeric composition is at least 5.0°, preferably at least 10.0°.
{14} A light scattering article comprising the polymeric composition according to any of {1} to {13}.
{15} Process for the manufacturing of a light scattering article according to {14} from the polymeric composition according to any of {1} to {12}, wherein the process comprises a process step selected from extrusion, injection moulding and cast moulding.

The following examples illustrate the present invention in detail but are not intended to be limiting in any way.

EXAMPLES

Testing of the Polymeric Compositions

Test specimens were produced by injection moulding from the blended polymeric compositions. The appropriate test specimens were tested by the following methods:

Impact strength: Charpy impact strength: ISO 179-1/1eU (2010)
  Charpy impact strength notched: ISO 179-1/1eA (2010)
  Apparatus: Pendulum impact tester (PSW) HIT25P, available from Zwick RoeII AG, Ulm, Germany
Modulus of elasticity and tensile modulus: modulus of elasticity and tensile modulus according to test standard ISO 527-2/1A/5 (2012). Specimen type 1A, test speed 1 mm/min. Apparatus: Universal testing machine (UPM) Z030, available from Zwick Roell AG, Ulm, Germany
Gloss: gloss measured according to DIN EN ISO 2813 (2015). The gloss measurements were carried out using a Byk Gardner micro-TRI-gloss glossmeter.
Surface roughness: Roughness variables $R_a$, $R_z$ and $R_{max}$ according to DIN EN ISO 4287 (2010). The cut-off: Ra values <2 µm are determined with a cut-off of 0.8 mm, and if Ra is greater than 2 µm the cut-off used is 2.5 mm. The roughness measurements were carried out using the Form Talysurf 50 produced by Rank Taylor Hobson GmbH.
Half-value angle: Determined according to the standard DIN 5036 (1980), using a GO T 1500 LMT goniometer test unit from the company LMT.
Transmittance: An Agilent Cary 5000 spectrophotometer was used to measure luminous transmittance ($D_{65}$), according to DIN EN ISO 13468-2 (2006).
Yellowness index Y.I: An Agilent Cary 5000 spectrophotometer was used to determine Y.I.) ($D_{65}/10°$ as defined in the standard ISO 17223 (2014 (E)) for CIE standard illuminant $D_{65}$ and colour system $X_{10}Y_{10}Z_{10}$.

The weathering tests were carried out with the following parameters:
  Instrument: Xenotest Beta LM/1
  Filter: Xenochrome 300 filter system, daylight (ISO 4892-2)
  Irradiance: 60 W/m² (300-400 nm)
  Radiant exposure after 2500h: 0.54 GJ/m² (300-400 nm)
  Temperatures: chamber 38±3° C., black standard 65±3° C.
  Humidity: 65±10% RH
  102 min dry, 18 min water spray Polymeric Matrix Material The polymeric material (PMMA) was prepared by mixing of 98.92 wt.-% of methyl methacrylate, 1.00 wt.-% of methyl acrylate, 0.04 wt.-% of dilauroyl peroxide and 0.04 wt.-% of n-dodecyl mercaptan, and heating the reaction mixture to 60° C. for 36 hours. The polymerisate was crushed by aid of a polymer mill and further processed on an extruder with degassing unit. The weight average molecular weight Mw of the resulting polymeric material, as determined by GPC using a PMMA as a standard and THF as an eluent, was about 100 000 g/mol.

Scattering Particles A (Inventive)

As scattering particles A (second scattering particles) TSR 9000 particles were employed. TSR 9000 particles are a mix of spherical siloxane particles having a narrow particle size distribution and a mean particle diameter of 2.2 µm. The refractive index $n_{D1}$ is 1.42. TSR 9000 is commercially available from Momentive Performance Materials (Leverkusen, Germany).

Scattering Particles B (Inventive)

As scattering particles B (first scattering particles) polyacrylate-based particles KaneAce™ MP91 with a mean particle diameter of 9.0 µm and a refractive index $n_{D1}$ of 1.43 were employed. KaneAce™ MP91 is commercially available from Kaneka Belgium BV (Westerlo, Belgium).

Scattering Particles C (Inventive)

As scattering particles C (second scattering particles) particles B2) described in the patent application WO 2005/022245 A1 (page 27) were used. These scattering particles are polymethacrylate-based particles with a mean particle diameter of 40.5 µm and a refractive index $n_{D2}$ of 1.53.

Scattering Particles D (Comparative)

Scattering particles D (second scattering particles) are polystyrene-based particles Techpolymer® SBX-8 commercially available from Sekisui Chemical Co. Ltd., Japan. Techpolymer® SBX-8 have a mean particle diameter of 8.0 µm and a refractive index $n_{D1}$ of 1.59.

Blending of the Polymeric Compositions

The scattering polymeric compositions of Examples 1, 2, 9 and 10 (Inventive Examples) and Examples 3-7, 11 and 12 (Comparative Examples) were prepared by means of an extruder using the polymeric matrix material described above and the respective scattering particles.

For this purpose, the beads of the polymeric matrix material where mixed with the scattering particles and dry blended in a tumble mixer. The obtained dry blends were homogenised using a Ø30 Stork extruder (processing temperature 250° C.) and granulated. In order to obtain a homogeneous scattering polymeric composition the blends were proceeded twice through the extruder.

The components of the scattering polymeric compositions of Examples 1, 2, 9 and 10 (Inventive Examples) and Examples 3-7, 11 and 12 (Comparative Examples) are listed in Table 1.

Comparative Example 3 and 4 of the present application illustrate the teaching of WO 2018/019965 A1 and Comparative Example 8 of the present application substantially corresponds to Example 2 of document WO 2016/137919 A1.

TABLE 1

Components of the scattering polymeric compositions of Examples 1, 2, 9 and 10 (Inventive Examples) and Examples 3-7, 11 and 12 (Comparative Examples)

| Components wt.-% | Ex. 1 | Ex. 2 | Comp. Ex. 3 | Comp. Ex. 4 | Comp. Ex. 5 | Comp. Ex. 6 | Comp. Ex. 7 | Comp. Ex. 8 | Ex. 9 | Ex. 10 | Comp. Ex. 11 | Comp. Ex. 12 |
|---|---|---|---|---|---|---|---|---|---|---|---|---|
| Polymeric matrix material | 95.00 | 93.25 | 96.78 | 96.65 | 99.65 | 97.00 | 88.00 | 96.20 | 97.60 | 97.90 | 98.00 | 92.50 |

TABLE 1-continued

Components of the scattering polymeric compositions of Examples 1, 2, 9 and 10 (Inventive Examples) and Examples 3-7, 11 and 12 (Comparative Examples)

| Components wt.-% | Ex. 1 | Ex. 2 | Comp. Ex. 3 | Comp. Ex. 4 | Comp. Ex. 5 | Comp. Ex. 6 | Comp. Ex. 7 | Comp. Ex. 8 | Ex. 9 | Ex. 10 | Comp. Ex. 11 | Comp. Ex. 12 |
|---|---|---|---|---|---|---|---|---|---|---|---|---|
| Scattering particles A | | | 0.22 | 0.35 | 0.35 | | | | | 0.40 | 0.10 | |
| Scattering particles B | 2.00 | 3.75 | | | | | | | 2.00 | 2.00 | 2.00 | 7.50 |
| Scattering particles C | 3.00 | 3.00 | 3.00 | 3.00 | | 3.00 | 12.00 | 3.00 | | | | |
| Scattering particles D | | | | | | | | 0.80 | | | | |

Subsequently, the obtained polymeric compositions were injection-moulded to plaques (140×40 mm$^2$) having 3 square segments with different wall thicknesses: 1, 2 and 3 mm. For this purpose, an injection moulding machine Allrounder 320C, commercially available from Arburg GmbH & Co KG (Lossburg, Germany) was used. The injection moulding temperature was 240° C.-265° C.

The processing parameters during the injection mouldings were identical for all tested polymeric compositions and are summarised in Table 2 below:

TABLE 2

Settings for processing of the polymeric compositions by injection moulding (Arburg Allrounder 320C injection-moulding machine) to plaques (140 × 40 × 1, 2 and 3 mm$^3$):

| Temperature, ° C. | |
|---|---|
| Melt | 245 |
| Cylinder | 240; 250; 260; 265 |
| Mould | 70 |
| Hot runner | 265 |
| Holding pressure | |
| 6 s | 600 bar |

Bars for Charpy impact strength (notched, unnotched) and bars for tensile strength evaluation test were injection-moulded according to DIN EN ISO 294 using a Battenfeld 350 CD injection moulding machine (available from Battenfeld Cincinnati Extrusion Holding GmbH, Bad Oeynhausen, Germany).

Bars for Charpy impact strength evaluation tests had the following geometry: 80×10×4 mm$^3$, Bars for tensile strength evaluation tests had the following geometry: 170×20/10×4 mm$^3$, dumbbell-shaped.

The processing parameters during the injection mouldings were identical for all tested polymeric compositions and are summarised in Table 3 below:

TABLE 3

Settings for processing of the polymeric compositions by injection moulding (Battenfeld 350 CD injection-moulding machine) to bars for Charpy impact strength evaluation tests and tensile strength evaluation tests

| Temperature, ° C. | |
|---|---|
| Melt | 248 |
| Cylinder | 248; 245; 240; 230 |
| Mould | 68 |

Extrusion

The monolayer plates were produced using an extrusion line from Dr. Collin (Dr. Collin GmbH, Ebersberg, Germany). A degassing extruder was used so that pre-drying of the granulate in a separate process step was not necessary. The melt temperature during the extrusion was about 255° C., the melt pressure was about 40 bar and the screw speed was 70 min$^{-1}$.

The roll speed was 0.750 m/min and the roll temperature was kept between 95° C. and 120° C. The obtained plate specimen had a uniform thickness of 2.0 mm.

Assessment of Optical and Mechanical Properties of Scattering Polymeric Compositions of Examples 1, 2, 9 and 10 (Inventive Examples) and Examples 3-7, 11 and 12 (Comparative Examples).

For evaluation of optical properties of all tested moulded compositions injection moulded plaques (140×40 mm$^2$) having 3 square segments with different wall thicknesses were used.

Measurements of Charpy impact strength and elasticity modulus were carried out with bars as described above.

Finally, for evaluation of the surface roughness $R_Z$ and gloss (60°) extruded specimen were used.

The obtained results are summarised in Table 4:

TABLE 4

Optical and mechanical properties of scattering polymeric compositions of Examples 1, 2, 9 and 10 (Inventive Examples) and Examples 3-7, 11 and 12 (Comparative Examples)

| Properties | Ex. 1 | Ex. 2 | Comp. Ex. 3 | Comp. Ex. 4 | Comp. Ex. 5 | Comp. Ex. 6 | Comp. Ex. 7 | Comp. Ex. 8 | Ex. 9 | Ex. 10 | Comp. Ex. 11 | Comp. Ex. 12 |
|---|---|---|---|---|---|---|---|---|---|---|---|---|
| Transmittance T (D65), %[a] | 87.5 | 81 | 83.4 | 78.6 | 81.4 | 89.6 | 86.2 | 70.22 | 73.1 | 86.0 | 89.2 | 73.8 |
| Half-value angle β, °[a] | 14.45 | 21.76 | 14.5 | 22.7 | 7.4 | 3.9 | 12.4 | 22.1 | 29.4 | 15.1 | 10.1 | 28.7 |
| Scattering impact η °[b] | 12.64 | 17.63 | 12.09 | 17.84 | 6.02 | 3.38 | 10.69 | 15.52 | 21.5 | 12.99 | 8.99 | 21.18 |
| Yellowness index (Y.I.)[a] | 1.4 | 3.4 | 2.5 | 3.4 | 1.9 | 0.7 | 3.2 | 7.2 | 2.6 | 1.4 | −0.5 | 4.2 |
| Yellowness index (Y.I.) after 2500 h[c] | 1.7 | | 2.6 | | | | | 11.1[f] | | 1.6 | | 3.8 |

TABLE 4-continued

Optical and mechanical properties of scattering polymeric compositions of Examples 1, 2, 9 and 10 (Inventive Examples) and Examples 3-7, 11 and 12 (Comparative Examples)

| Properties | Ex. 1 | Ex. 2 | Comp. Ex. 3 | Comp. Ex. 4 | Comp. Ex. 5 | Comp. Ex. 6 | Comp. Ex. 7 | Comp. Ex. 8 | Ex. 9 | Ex. 10 | Comp. Ex. 11 | Comp. Ex. 12 |
|---|---|---|---|---|---|---|---|---|---|---|---|---|
| Charpy impact strength, kJ/m² [d] | 32 | 31 | 20.0 | | | 18.0 | 16.0 | | 38 | | | 41 |
| Elasticity modulus, MPa [d] | 3170 | 3150 | 3300 | | | 3300 | 3300 | | 3180 | | | 2900 |
| Surface roughness Rz, μm [e] | 7 | | 6.2 | | smooth surface | 6 | | | smooth surface | smooth surface | smooth surface | |
| Gloss (60° C.) [e] | 42 | | 52 | | | 54 | | | | | | |
| Vicat softening temperature, ° C. [a] | 104.5 | 104.3 | 105.9 | | | | 104.1 | | 104.4 | | 105.6 | 105 |

[a] measured on an injection-moulded plaques (140 × 40 mm²) having three square segments with different wall thicknesses: 1, 2 and 3 mm at a thickness of 2.0 mm;
[b] scattering impact η = T*ß was calculated according to the formula: η = (T*ß)/100%
[c] measured on an injection-moulded plaques (140 × 40 mm²) having three square segments with different wall thicknesses: 1, 2 and 3 mm at a thickness of 2.0 mm after an accelerated laboratory weathering test according to the standard DIN EN ISO 4892-2 (2013) under the following conditions: total exposure time: 2 500 h; radiant exposure: 0.54 GJ/m²; irradiance: 60 ± 2 W/m²;
[d] measured on an injection-moulded standard specimen having the following dimensions: 170 × 20/10 × 4 mm, dumbbell-shaped;
[e] measured on an extruded specimen having a thickness of 2.0 mm;
[f] measured on an injection-moulded plaques (140 × 40 mm²) having three square segments with different wall thicknesses: 1, 2 and 3 mm at a thickness of 2.0 mm after an accelerated laboratory weathering test according to the standard DIN EN ISO 4892-2 (2013) under the following conditions: total exposure time: 1 000 h; radiant exposure: 0.216 GJ/m²; irradiance: 60 ± 2 W/m².

As can be noted from Table 1, scattering polymeric compositions of Examples 1, 2, 9 and 10 (Inventive Examples) comprise in total less than 7 wt.-% of scattering particles, based on the weight of the scattering polymeric composition. These polymeric compositions have excellent mechanical properties and, in particular, Charpy-impact resistance of about 31 kJ/m² or even higher. This stands in contrast to scattering polymeric compositions of Examples 3-7, 11 (Comparative Examples), where Charpy-impact resistance does not exceed 20 kJ/m².

Due to the presence of a combination of the first scattering particles (particles B) and the second scattering particles (particles A or C), these polymeric compositions have a half-value angle β of about 14.5° or even higher. This stands in contrast to light scattering polymeric compositions of the prior art in which a high scattering efficiency i.e. a high half-value angle could only be achieved by using a high amount of scattering particles, which, in turn, has a negative effect on the mechanical properties of the polymeric composition.

Scattering impact η=T*β is an important parameter characterising the scattering efficiency of a polymeric composition. The higher scattering impact is, the lower are undesired light losses in the polymeric composition. Importantly, the scattering impact of the polymeric compositions of Examples 1, 2, 9 and 10 (Inventive Examples) is as high as 13.0° or even higher.

In contrast to scattering moulding compositions of the prior art (cf. e.g. WO 2016/137919 A1) the yellowness index Y.I. of the polymeric compositions of Examples 1, 2, 9 and 10 (Inventive Examples) as defined in the standard ISO 17223 (2014) does not exceed 3.5. Therefore, use of additives such as blueing agents in the compositions of the present invention is not necessary.

The composition of Comparative Example 5 differs from the compositions of Example 4 in that no second scattering particles (scattering particles C) are present. For this reason, the half-value angle of this polymeric composition i.e. its scattering efficiency is significantly lower than it is the case with the compositions of the present invention.

The composition of Comparative Example 6 differs from the composition of Example 4 in that no second scattering particles (scattering particles A) are present. Again, the half-value angle of this polymeric composition i.e. its scattering efficiency is significantly lower than it is the case with the polymeric compositions of the present invention.

Comparative Example 7 illustrates a common scattering polymeric composition of the prior art which comprises a large amount of second scattering particles and no first scattering particles. Although this polymeric composition has good optical properties, its Charpy impact strength is only moderate (16.0 kJ/m²).

Comparative Example 8 of the present application substantially corresponds to Example 2 of document WO 2016/137919 A1. The composition of Comparative Example 8 differs from the compositions of Examples 1-4 in that instead of the first scattering particles polystyrene-based scattering particles SBX-8 are used. The resulting polymeric composition has a high scattering impact η but its transmittance T is as low as 70.22%. Additionally, this polymeric composition has a disadvantageously high yellowness index Y.I. of 7.2 and a poor weathering resistance.

The compositions of Comparative Examples 11 and 12 lack second scattering particles. As a consequence, these compositions only have moderate mechanical properties and, in particular, elasticity modulus of only 2900 MPa. The yellowness index Y.I. in the Comparative Example 12 was as high as 4.2.

The invention claimed is:
1. A polymeric composition, comprising:
from 90.0 wt.-% to 99.9 wt.-%, based on the weight of the polymeric composition, of a polymeric matrix material, which is substantially transparent and has a refractive index $n_{Dm}$ of from 1.35 to 1.65;
from 0.05 wt.-% to 5.0 wt.-%, based on the weight of the polymeric composition, of a plurality of first scattering particles being polybutylacrylate-based scattering particles, which are uniformly dispersed in the polymeric matrix material, wherein the first scattering particles are substantially spherical crosslinked polymeric particles having an average particle size $d_1$ of from 5.0 μm to 20.0 μm and having a refractive index $n_{D1}$,
wherein the refractive index $n_{D1}$ is lower than the refractive index $n_{Dm}$ and an absolute difference between the refractive index $n_{D1}$ and the refractive index $n_{Dm}$ is not lower than 0.04; and
from 0.07 wt-% to 3.0 wt.-%, based on the weight of the polymeric composition, of a plurality of second scattering particles chemically different from the first scattering particles, which are uniformly dispersed in the polymeric matrix material, wherein the second scattering particles are substantially spherical crosslinked polymeric particles having an average particle size $d_2$ of from 1.0 μm to 50.0 μm and having a refractive index $n_{D2}$;
wherein an absolute difference between the refractive index $n_{D2}$ and the refractive index $n_{Dm}$ is from 0.005 to 0.1, wherein the refractive indexes $n_{Dm}$, $n_{D1}$, and $n_{D2}$ are measured at the Na D-line at 589 nm at 23° C., wherein the average particle size of the first scattering particles and of the second scattering particles is a volume averaged $d_{50}$ value and is measured in accordance with the standard for laser diffraction measurements ISO 13320-1 (2009), and wherein the second scattering particles comprise a crosslinked polysiloxane.

2. The polymeric composition according to claim 1, wherein the absolute difference between the refractive index $n_{D1}$ and the refractive index $n_{Dm}$ is from 0.05 to 0.16.

3. The polymeric composition according to claim 1, wherein the absolute difference between the refractive index $n_{D2}$ and the refractive index $n_{Dm}$ is from 0.01 to 00-1-4.

4. The polymeric composition according to claim 1, wherein an absolute difference between the refractive index $n_{D1}$ and the refractive index $n_{D2}$ is from 0.001 to 0.15.

5. The polymeric composition according to claim 1, wherein the polymeric matrix material is selected from the group consisting of polyalkyl(meth)acrylates, polycarbonates, polystyrenes, poly(meth)acrylalkylimides, polyacrylonitriles, polyamides, polyester, polyolefines, copolymers thereof, and mixtures thereof.

6. The polymeric composition according to claim 1, wherein the polymeric matrix material is polyalkyl(meth) acrylate being a copolymer, the copolymer comprising
from 80.0 wt.-% to 100.0 wt.-% of methyl methacrylate units, and
from 0.0 wt.-% to 20.0 wt.-% of $C_1$-$C_{10}$-alkyl acrylate units,
based on the weight of the copolymer.

7. The polymeric composition according to claim 1, wherein the second scattering particles further comprise at least one of crosslinked polyalkyl(meth)acrylate and polystyrene, and the polymeric composition comprises
from 0.5 wt.-% to 3.0-% of the second scattering particles, based on the weight of the polymeric composition.

8. The polymeric composition according to claim 1, wherein a half-value angle of the polymeric composition, measured with a specimen having a thickness of 2.0 mm according to the standard DIN 5036 (1980), is at least 5°.

9. The polymeric composition according to claim 1, wherein a yellowness index Y.I. of the polymeric composition, as defined in the standard ISO 17223 (2014), measured with a specimen having a thickness of 2.0 mm, is not more than 5.0.

10. The polymeric composition according to claim 1, wherein a transmittance ($D_{65}$) of the polymeric composition is at least 50%, determined on a specimen with a thickness of 2.0 mm according to the standard ISO 13468-2.

11. The polymeric composition according to claim 1, wherein a scattering impact of the polymeric composition is at least 5.0°, wherein the scattering impact is defined as a product of an optical transmittance T $D_{65}$ and a half-value angle.

12. A light scattering article, comprising:
the polymeric composition according to claim 1.

13. A process for manufacturing a light scattering article, comprising:
extruding, injection moulding, or cast moulding the polymeric composition according to claim 1.

14. The polymeric composition according to claim 1, wherein the polymeric composition comprises
from 1.0 wt.-% to 4.0 wt.-%, based on the weight of the polymeric composition, of the plurality of the first scattering particles.

15. The polymeric composition according to claim 2, wherein the absolute difference between the refractive index $n_{D1}$ and the refractive index $n_{Dm}$ is from 0.05 to 0.10.

16. The polymeric composition according to claim 3, wherein the absolute difference between the refractive index $n_{D2}$ and the refractive index $n_{Dm}$ is from 0.02 to 0.09.

17. The polymeric composition according to claim 6, wherein the copolymer comprises
from 95.0 wt.-% to 99.8 wt.-%, of methyl methacrylate units, and
from 0.2 wt.-% to 5.0 wt.-% of $C_1$-$C_{10}$-alkyl acrylate units,
based on the weight of the copolymer.

18. The polymeric composition according to claim 1, wherein the polymeric composition comprises
from 0.1 wt.-% to 1.0 wt.-% of the second scattering particles, based on the weight of the polymeric composition.

19. The polymeric composition according to claim 7, wherein the polymeric composition comprises
from 2.0 wt.-% to 3.0 wt-% of the second scattering particles, based on the weight of the polymeric composition.

20. A polymeric composition, comprising:
from 90.0 wt.-% to 99.9 wt-%, based on the weight of the polymeric composition, of a polymeric matrix material, which is substantially transparent and has a refractive index $n_{Dm}$ of from 1.35 to 1.65;
from 0.05 wt.-% to 5.0 wt-%, based on the weight of the polymeric composition, of a plurality of first scattering particles being polybutylacrylate-based scattering particles, which are uniformly dispersed in the polymeric matrix material, wherein the first scattering particles are substantially spherical crosslinked polymeric particles having an average particle size $d_1$ of from 5.0 μm to 20.0 μm and having a refractive index $n_{D1}$,
wherein the refractive index $n_{D1}$ is lower than the refractive index $n_{Dm}$ and an absolute difference between the refractive index $n_{D1}$ and the refractive index $n_{Dm}$ is not lower than 0.04; and
from 0.05 wt.-% to 5.0 wt.-%, based on the weight of the polymeric composition, of a plurality of second scattering particles chemically different from the first scattering particles, which are uniformly dispersed in the polymeric matrix material, wherein the second scattering particles are substantially spherical crosslinked polymeric particles having an average particle size $d_2$ of from 1.0 μm to 50.0 μm and having a refractive index $n_{D2}$,
wherein an absolute difference between the refractive index $n_{D2}$ and the refractive index $n_{Dm}$ is from 0.005 to 0.1,
wherein the refractive indexes $n_{Dm}$, $n_{D1}$, and $n_{D2}$ are measured at the Na D-line at 589 nm at 23° C.,
wherein the average particle size of the first scattering particles and of the second scattering particles is a volume averaged $d_{50}$ value and is measured in accordance with the standard for laser diffraction measurements ISO 13320-1 (2009), and
wherein a half-value angle of the polymeric composition, measured with a specimen having a thickness of 2.0 mm according to the standard DIN 5036 (1980), is at least 5°.

* * * * *